US007783264B2

(12) United States Patent
Oishi et al.

(10) Patent No.: US 7,783,264 B2
(45) Date of Patent: Aug. 24, 2010

(54) DIVERSITY APPARATUS USING LEAKAGE TRANSMISSION PATH

(75) Inventors: Sadatoshi Oishi, Fuji (JP); Tomonori Sugiyama, Shizuoka (JP); Jun Yaginuma, Izunokuni (JP)

(73) Assignee: Toshiba Tec Kabushiki Kaisha (JP)

( * ) Notice: Subject to any disclaimer, the term of this patent is extended or adjusted under 35 U.S.C. 154(b) by 902 days.

(21) Appl. No.: 11/541,953

(22) Filed: Oct. 2, 2006

(65) Prior Publication Data

US 2007/0077897 A1 Apr. 5, 2007

(30) Foreign Application Priority Data

Oct. 5, 2005 (JP) ............................ 2005-292573

(51) Int. Cl.
*H04B 1/44* (2006.01)

(52) U.S. Cl. .......................... 455/78; 455/14; 455/101; 455/88; 455/523; 455/504; 455/82; 343/702; 343/770; 333/237

(58) Field of Classification Search .................. 455/78, 455/561, 82, 504, 523, 14, 88, 101; 333/237; 343/702, 770
See application file for complete search history.

(56) References Cited

U.S. PATENT DOCUMENTS

| | | | | | |
|---|---|---|---|---|---|
| 4,246,656 | A | * | 1/1981 | Wood et al. | 455/136 |
| 4,903,257 | A | * | 2/1990 | Takeda et al. | 370/280 |
| 5,521,561 | A | * | 5/1996 | Yrjola et al. | 333/103 |
| 5,802,463 | A | * | 9/1998 | Zuckerman | 455/208 |
| 5,805,983 | A | * | 9/1998 | Naidu et al. | 455/67.16 |
| 5,818,385 | A | * | 10/1998 | Bartholomew | 342/372 |
| 6,005,884 | A | * | 12/1999 | Cook et al. | 375/132 |
| 6,108,526 | A | * | 8/2000 | van der Plas | 455/78 |
| 6,131,022 | A | * | 10/2000 | Jacomb-Hood et al. | 455/276.1 |
| 6,243,563 | B1 | * | 6/2001 | Nakamura | 455/78 |
| 6,545,563 | B1 | * | 4/2003 | Smith | 333/103 |
| 6,639,939 | B1 | * | 10/2003 | Naden et al. | 375/140 |
| 6,640,110 | B1 | * | 10/2003 | Shapira et al. | 455/562.1 |
| 6,671,496 | B1 | * | 12/2003 | Hoshi | 455/78 |
| 6,781,544 | B2 | * | 8/2004 | Saliga et al. | 343/700 MS |
| 6,826,391 | B2 | * | 11/2004 | Leinonen et al. | 455/277.1 |
| 6,906,601 | B2 | * | 6/2005 | Fayyaz | 333/156 |
| 6,914,943 | B2 | * | 7/2005 | Shimizu | 375/302 |
| 7,289,573 | B2 | * | 10/2007 | Fusco et al. | 375/295 |
| 7,302,247 | B2 | * | 11/2007 | Dupuis | 455/280 |
| 7,440,488 | B2 | * | 10/2008 | Feher | 375/146 |

(Continued)

FOREIGN PATENT DOCUMENTS

| | | |
|---|---|---|
| JP | 56-001635 | 1/1981 |

(Continued)

OTHER PUBLICATIONS

Communication mailed Oct. 14, 2008 (with translation) from Japanese Patent Office re related application No. 2005-292573.

*Primary Examiner*—Marceau Milord
(74) *Attorney, Agent, or Firm*—Harness, Dickey & Pierce, P.L.C.

(57) ABSTRACT

A diversity apparatus includes a transceiver, a phase shifter which switches phases of a carrier wave transmitted from the transceiver, and a leakage transmission path which transmits the carrier wave output from the phase shifter. The transceiver switches a phase of the phase shifter depending on a receiving level.

8 Claims, 2 Drawing Sheets

U.S. PATENT DOCUMENTS

| | | | | |
|---|---|---|---|---|
| 7,515,884 | B2 * | 4/2009 | Blech et al. | 455/127.1 |
| 2002/0155863 | A1 * | 10/2002 | Fischer et al. | 455/562 |

FOREIGN PATENT DOCUMENTS

| | | |
|---|---|---|
| JP | 63-292832 | 11/1988 |
| JP | 01-149619 | 6/1989 |
| JP | 6-34345 | 5/1994 |
| JP | 08-195702 | 7/1996 |
| JP | 08-298473 | 11/1996 |
| JP | 8-298473 | 11/1996 |
| JP | 2002-164707 | 6/2002 |

* cited by examiner

DIVERSITY APPARATUS USING LEAKAGE TRANSMISSION PATH

CROSS-REFERENCE TO RELATED APPLICATIONS

This application is based upon and claims the benefit of priority from prior Japanese Patent Application No. 2005-292573, filed Oct. 5, 2005, the entire contents of which are incorporated herein by reference.

BACKGROUND OF THE INVENTION

1. Field of the Invention

The present invention relates to a diversity apparatus using a leakage transmission path as an antenna.

2. Description of the Related Art

A conventional antenna device using a leaky coaxial cable with which a diversity system is employed is known. In Jpn. Pat. Appln. KOKAI Publication No. 8-298473, two systems are disclosed as antenna devices of this type.

In an antenna device of the first system, one leaky coaxial cable is used. A transceiver and a terminal resistor are selectively connected to one end of the leaky coaxial cable by a switch. The transceiver and another terminal resistor are selectively connected to the other end of the leaky coaxial cable by another switch.

When the transceiver is connected to one end of the leaky coaxial cable, the terminal resistor is connected to the other end of the leaky coaxial cable. In this state, when an antenna device of a mobile object is located in a radio wave dead zone, each switch is changed over. As a result, the terminal resistor is connected to one end of the leaky coaxial cable, and the transceiver is connected to the other end thereof. In this manner, a diversity effect is obtained.

In an antenna device of the second system, two leaky coaxial cables are used. The two leaky coaxial cables are arranged parallel to each other. A transceiver is connected to one end of one leaky coaxial cable through a switch. A terminal resistor is connected to the other end of one leaky coaxial cable. The same transceiver is connected to one end of another leaky coaxial cable through the same switch. Another terminal resistor is connected to the other end of the other leaky coaxial cable. One end of the other leaky coaxial cable and the other end of one leaky coaxial cable are on the same side.

In use of one leaky coaxial cable, when an antenna device of a mobile object is located in a radio wave dead zone, the switch is changed over. As a result, the other leaky coaxial cable is in use. In this manner, a diversity effect is obtained.

However, each of the first and second antenna devices is entirely arranged in the form of a loop. For this reason, the lay-down of the leaky coaxial cable is disadvantageously limited.

BRIEF SUMMARY OF THE INVENTION

A diversity apparatus which can obtain a diversity effect by one leakage transmission path, which can freely lay down the leakage transmission path without limitation, and which uses a leakage transmission path is desired.

A diversity apparatus according to embodiments of the present invention comprises: a transceiver; a phase shifter which switches phases of a carrier wave transmitted from the transceiver; and a leakage transmission path which transmits the carrier wave output from the phase shifter. The transceiver controls the phase shifter such that a phase of the phase shifter is switched depending on a receiving level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First, a first embodiment will be described below with reference to FIGS. 1 to 3.

Figure 1:
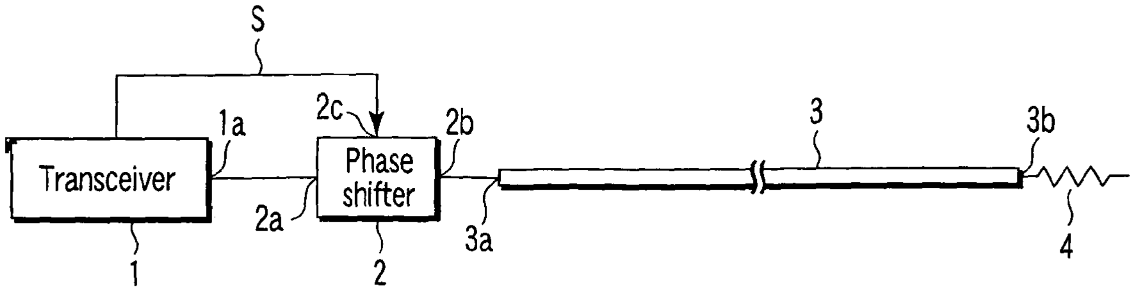
FIG. 1 is a diagram showing a configuration of a diversity apparatus using a leakage transmission path according to a first embodiment.

FIG. 1 is a block diagram of a diversity apparatus according to the first embodiment. The diversity apparatus includes a transceiver 1 which transmits and receives a signal, a phase shifter 2 which switches phases of a carrier wave of the signal transmitted from the transceiver 1, a leakage transmission path 3 such as a leakage coaxial cable, and a terminal resistor 4.

A first terminal 2*a* of the phase shifter 2 is connected to a terminal 1*a* of the transceiver 1. One end 3*a* of the leakage transmission path 3 is connected to a second terminal 2*b* of the phase shifter 2. The terminal resistor 4 is connected to the other end 3*b* of the leakage transmission path 3.

Figure 2:
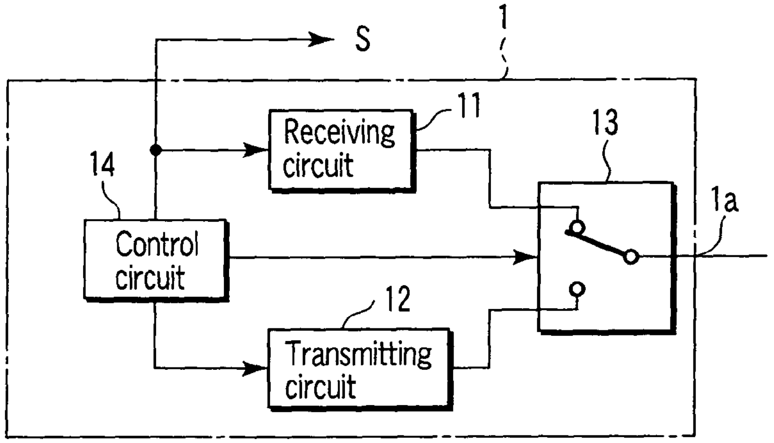
FIG. 2 is a block diagram showing a configuration of a transceiver in the embodiment.

The transceiver 1, as shown in FIG. 2, includes a receiving circuit 11, a transmitting circuit 12, a changeover switch 13, and a control circuit 14. The changeover switch 13 switches the terminal 1*a* to be connected to the receiving circuit 11 or the transmitting circuit 12. The control circuit 14 controls the receiving circuit 11, the transmitting circuit 12, and the changeover switch 13. The control circuit 14 supplies a control signal S to a third terminal 2*c* of the phase shifter 2 to control the phase shifter 2.

Figure 3:
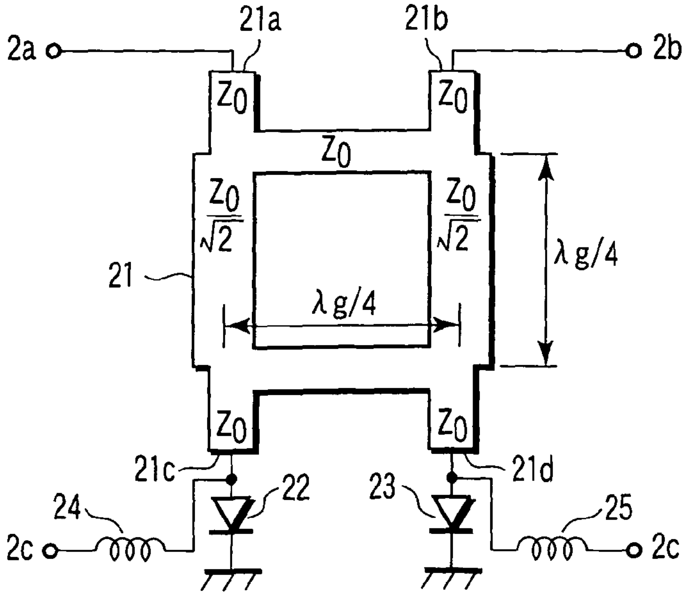
FIG. 3 is a diagram showing a circuit configuration of a phase shifter in the embodiment.

The phase shifter 2, as shown in FIG. 3, includes a circuit 21 of a branch-line type having four terminals 21*a*, 21*b*, 21*c*, and 21*d*. Of the two terminals 21*a* and 21*b* on the same side of the circuit 21, one terminal 21*a* is connected to the first terminal 2*a*, and the other terminal 21*b* is connected to the second terminal 2*b*. The two terminals 21*c* and 21*d* on the other side of the circuit 21 are grounded with forward polarities through PIN diodes (p-intrinsic-n Diodes) 22 and 23, respectively.

When the control signal S is input from the third terminal 2*c*, the control signal S is supplied to the anodes of the PIN diodes 22 and 23 through inductors 24 and 25, respectively. Thus, a DC bias is applied to the PIN diodes 22 and 23. As a result, λg/4, i.e., a phase difference of 90° is generated in the phase shifter 2. The reference symbol λg denotes a wavelength set when the carrier wave propagates through the phase shifter 2.

In the diversity apparatus having the above configuration, a carrier wave signal transmitted from the transmitting circuit 12 of the transceiver 1 is supplied to the leakage transmission path 3 through the phase shifter 2. Thus, a radio wave is radiated from a large number of slots formed on the leakage transmission path 3 into a space. Therefore, when a wireless communication terminal is arranged near the leakage transmission path 3, the wireless communication terminal can wirelessly communicate with the transceiver 1 through the leakage transmission path 3.

Radio waves radiated from the slots of the leakage transmission path 3 are synthesized in the space. For this reason, depending on the position of the wireless communication terminal, a receiving level may be lowered. This is also applied when the transceiver 1 receives a radio wave from the wireless communication terminal.

When the control circuit 14 of the transceiver 1 detects that the receiving level of the receiving circuit 11 is low, the control signal S is supplied to the phase shifter 2. In the phase shifter 2, a DC bias is applied to the PIN diodes 22 and 23 to generate a phase difference of 90°. Therefore, when the phase of the phase shifter 2 is 0°, the phase is switched to 90°. In this state, the receiving circuit 11 continues communication with the wireless communication terminal through the leakage transmission path 3. In this manner, the receiving level of the receiving circuit 11 is increased.

A timing at which the phases of the phase shifter 2 are switched by the transceiver 1 and a determination reference for switching may be the same as those in an operation of a diversity apparatus used in a general wireless LAN or the like.

In this manner, the diversity apparatus according to the first embodiment switches phases of the phase shifter 2 when the receiving level is lowered to obtain a diversity effect. Therefore, the diversity effect can be easily obtained by even one leakage transmission path 3. As a result, preferable wireless communication can be performed.

Furthermore, one terminal of the leakage transmission path 3 is merely connected to the phase shifter 2, and the other end is merely connected to the terminal resistor 4. More specifically, an entire transmission path including the leakage transmission path 3 need not be formed in the form of a loop. Therefore, the leakage transmission path 3 can be freely laid down depending on applications.

A second embodiment will be described below with reference to FIGS. 4 and 5. The same reference numerals as in the first embodiment denote the same parts in the second embodiment, and a description thereof will be omitted.

Figure 4:
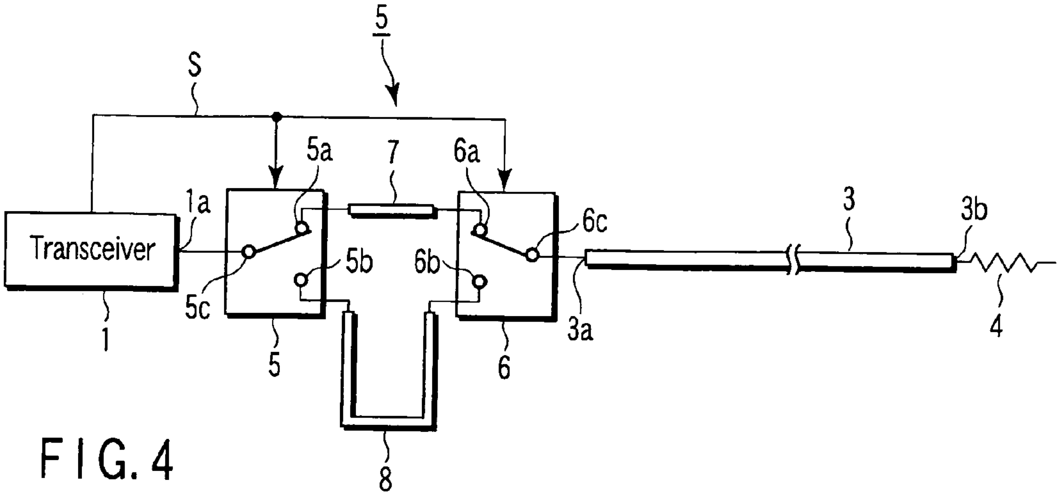
FIG. 4 is a diagram showing a configuration of a diversity apparatus using a leakage transmission path according to a second embodiment.

FIG. 4 is a block diagram of a diversity apparatus according to the second embodiment. The diversity apparatus includes a transceiver 1, a leakage transmission path 3, a terminal resistor 4, a switch 5, a first transmission line 7, and a second transmission line 8. The switch 5 has a first changeover switch 50, and a second changeover switch 60.

The changeover switches 50 and 60 include first contacts 5*a* and 6*a*, second contacts 5*b* and 6*b*, and common contacts 5*c* and 6*c*, respectively. The changeover switches 50 and 60 perform switching operations such that the common contacts 5*c* and 6*c* alternatively connect the first contacts 5*a* and 6*a* and the second contacts 5*b* and 6*b*.

The common contact 5*c* of the first changeover switch 50 is connected to a terminal 1*a* of the transceiver 1. The common contact 6*c* of the second changeover switch 60 is connected to one end 3*a* of the leakage transmission path 3. The other end 3*b* of the leakage transmission path 3 is connected to the terminal resistor 4.

The first transmission line 7 is connected between the first contact 5*a* of the first changeover switch 50 and the first contact 6*a* of the second changeover switch 60. The second transmission line 8 is connected between the second contact 5*b* of the first changeover switch 50 and the second contact 6*b* of the second changeover switch 60.

The second transmission line 8 has a line length longer than that of the first transmission line 7. The line lengths of the first transmission line 7 and the second transmission line 8 are set such that a difference between both the line lengths is about λg/4. Reference symbol λg denotes a wavelength set when a carrier wave propagates through the transmission lines 7 and 8.

A phase shifter according to the second embodiment includes the first and second changeover switches 50 and 60 constituting the switch 5 and the first and second transmission lines 7 and 8.

The transceiver 1 has the same configuration as that of the first embodiment shown in FIG. 2. More specifically, the transceiver 1 controls the changeover switches 50 and 60 by a control signal S from a control circuit 14.

The changeover switches 50 and 60 connect the common contacts 5*c* and 6*c* to the first contacts 5*a* and 6*a*, respectively, when the control signal S is not input. When the control signal S is input, the changeover switches 50 and 60 perform switching operations to connect the common contacts 5*c* and 6*c* to the second contacts 5*b* and 6*b*, respectively.

In this manner, when no control signal S is output from the transceiver 1, the first contacts 5*a* and 6*a* of the first and second first changeover switches 50 and 60 are on, and the second contacts 5*b* and 6*b* are off. In this state, the terminal 1*a* of the transceiver 1 and the one end 3*a* of the leakage transmission path 3 are connected to each other by the first transmission line 7.

In this case, a carrier wave signal transmitted from a transmitting circuit 12 of the transceiver 1 is supplied to the leakage transmission path 3 through the first transmission line 7. Thus, radio waves are radiated from a large number of slots formed on the leakage transmission path 3 into a space. Therefore, a wireless communication terminal arranged near the leakage transmission path 3 can wirelessly communicate with the transceiver 1 through the leakage transmission path 3.

In this case, when the transceiver 1 detects that a receiving circuit 11 has a low receiving level, the control signal S is output from the control circuit 14 to the first and second first changeover switches 50 and 60. Thus, the first and second changeover switches 50 and 60 perform switching operations. More specifically, the first contacts 5*a* and 6*a* are turned off, and the second contacts 5*b* and 6*b* are turned on. As a result, the terminal 1*a* of the transceiver 1 and the end 3*a* of the leakage transmission path 3 are connected to each other by the second transmission line 8.

In this case, a carrier wave signal transmitted from the transmitting circuit 12 of the transceiver 1 is supplied to the leakage transmission path 3 through the second transmission line 8. A carrier wave of this signal is switched in phase by 90° while propagating through the second transmission line 8. In this state, the receiving circuit 11 continues communication with the wireless communication terminal through the leakage transmission path 3. As a result, the receiving level of the receiving circuit 11 is increased.

A timing at which the first and second changeover switches 50 and 60 are switched and a determination reference for switching may be the same as those in an operation of a diversity apparatus used in a general wireless LAN or the like.

In this manner, when the receiving level is lowered, the diversity apparatus according to the second embodiment switches the transmission line for transmitting a carrier wave signal from the first transmission line 7 to the second transmission line 8 to obtain a diversity effect. Therefore, the diversity effect can be easily obtained by even one leakage transmission path 3. As a result, preferable wireless communication can be performed.

Furthermore, one terminal of the leakage transmission path 3 is merely connected to the common contact 6*c* of the second changeover switch 60, and the other end is merely connected to the terminal resistor 4. More specifically, an entire transmission path including the leakage transmission path 3 need not be formed in the form of a loop. Therefore, the leakage transmission path 3 can be freely laid down depending on applications.

Figure 5:
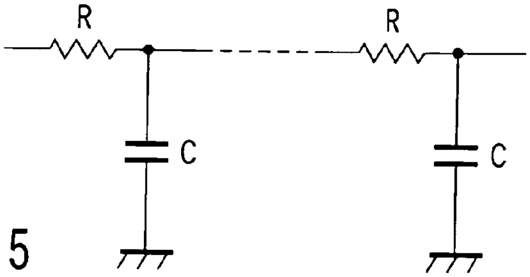
FIG. 5 is a circuit diagram showing a modification of a transmission path constituting a phase shifter in the embodiment.

The first and second transmission lines 7 and 8, as shown in FIG. 5, may be replaced with a circuit obtained by combining series resistors R and parallel capacitors C to each other.

A third embodiment will be described below with reference to FIGS. 6 and 7.

The same reference numerals as in the embodiments described above denote the same parts in the third embodiment, and a description thereof will be omitted.

Figure 6:
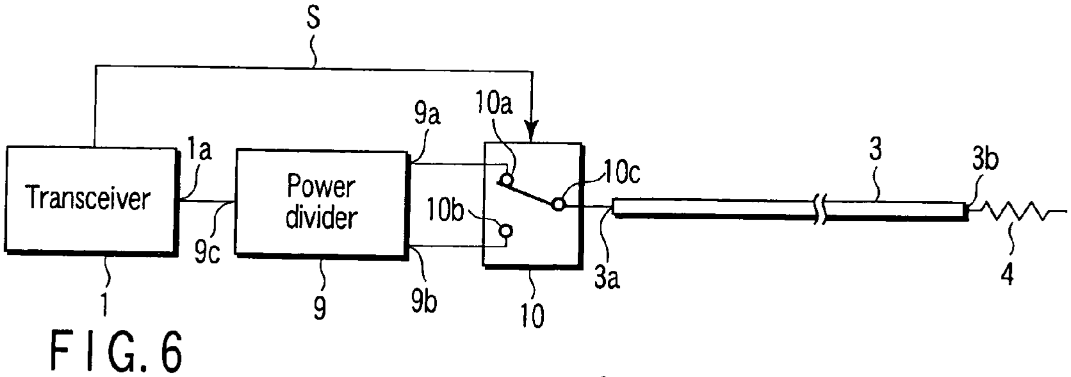
FIG. 6 is a diagram showing a configuration of a diversity apparatus using a leakage transmission path according to a third embodiment.
Figure 7:
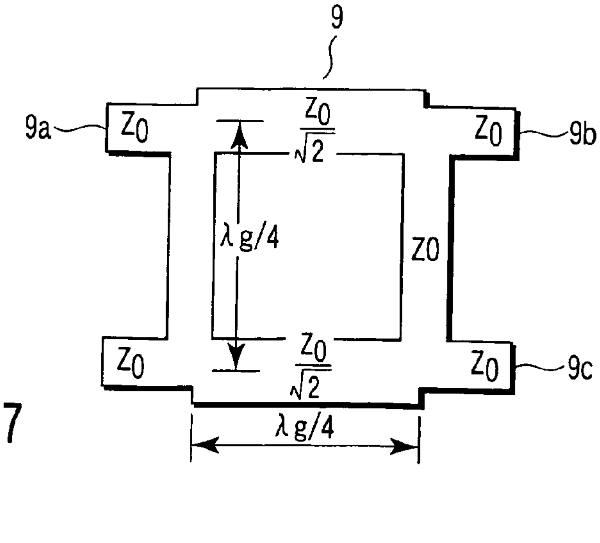
FIG. 7 is a diagram showing a circuit configuration of a power divider in the embodiment.

FIG. 6 is a block diagram of a diversity apparatus according to the third embodiment. The diversity apparatus includes a transceiver 1, a leakage transmission path 3, a terminal resistor 4, a power divider 9, and a switch 10.

The switch 10 includes a first contact 10*a*, a second contact 10*b*, and a common contact 10*c*. The switch 10 performs a switching operation such that the common contact 10*c* alternatively connects the first contact 10*a* and the second contact 10*b* to each other.

The common contact 10*c* of the switch 10 is connected to one terminal 3*a* of the leakage transmission path 3. The terminal resistor 4 is connected to the other terminal 3*b* of the leakage transmission path 3.

The first contact 10*a* of the switch 10 is connected to a first terminal 9*a* of the power divider 9. The second contact 10*b* of the switch 10 is connected to a second terminal 9*b* of the power divider 9. A terminal 1*a* of the transceiver 1 is connected to a third terminal 9*c* of the power divider 9.

The power divider 9 which distributes input power includes a hybrid coupler which distributes, for example, input power in half (3 dB). A circuit configuration of the power divider 9 using the 3-dB hybrid coupler is shown in FIG. 7. In the power divider 9, phase differences of 0° and 90° are generated in a path extending from the first terminal 9*a* to the third terminal 9*c* and a path extending from the second terminal 9*b* to the third terminal 9*c*, respectively. The power divider 9 is formed in a microstrip line format.

A phase shifter according to the third embodiment includes the power divider 9 and the switch 10.

The transceiver 1 has the same configuration as that of the first embodiment shown in FIG. 2. More specifically, the transceiver 1 controls the switch 10 by a control signal S from a control circuit 14.

The switch 10 connects the common contact 10*c* to the first contact 10*a* when no control signal S is input. When the control signal S is input, the switch 10 performs a switching operation to connect the common contact 10*c* to the second contact 10*b*.

In this manner, when no control signal S is output from the transceiver 1, the first contact 10*a* of the switch 10 is on, and the second contact 10*b* is off.

In this case, a carrier wave signal transmitted from the transmitting circuit 12 of the transceiver 1 is supplied from the third terminal 9*c* of the power divider 9 to the leakage transmission path 3 through the first terminal 9*a*. Thus, radio waves are radiated from a large number of slots formed on the leakage transmission path 3 into a space. Therefore, a wireless communication terminal arranged near the leakage transmission path 3 can wirelessly communicate with the transceiver 1 through the leakage transmission path 3.

In this case, when the transceiver 1 detects that a receiving circuit 11 has a low receiving level, the control signal S is output from the control circuit 14 to the switch 10. As a result, the switch 10 performs a switching operation. More specifically, the first contact 10*a* is turned off, and the second contact 10*b* is turned on.

In this case, a carrier wave signal transmitted from the transmitting circuit 12 of the transceiver 1 is supplied from the third terminal 9*c* of the power divider 9 to the leakage transmission path 3 through the second terminal 9*b*. A carrier wave of this signal is switched in phase by 90° while propagating through the power divider 9. In this state, the receiving circuit 11 continues communication with the wireless communication terminal through the leakage transmission path 3. As a result, the receiving level of the receiving circuit 11 is increased.

A timing at which the transceiver 1 performs switching control of the switch 10 and a determination reference for switching may be the same as those in an operation of a diversity apparatus used in a general wireless LAN or the like.

In this manner, the diversity apparatus according to the third embodiment switches the transmission paths in the power divider 9 which transmits a carrier wave signal when a receiving level is lowered to obtain a diversity effect. Therefore, the diversity effect can be easily obtained by even one leakage transmission path 3. As a result, preferable wireless communication can be performed.

Furthermore, one terminal of the leakage transmission path 3 is merely connected to the common contact 10*c* of the switch 10, and the other end is merely connected to the terminal resistor 4. More specifically, an entire transmission path including the leakage transmission path 3 need not be formed in the form of a loop. Therefore, the leakage transmission path 3 can be freely laid down depending on applications.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A diversity apparatus using a leakage transmission path comprising:

a transceiver transmitting a carrier wave having power;

a phase shifter including a power divider which distributes the power; and a switch which switches distributed powers from the power divider to output any one of the distributed powers, the phase shifter switching phases of the carrier wave transmitted from the transceiver; and a single leakage transmission path which transmits the carrier wave output from the phase shifter, wherein the transceiver controls the phase shifter such that a phase of the phase shifter is switched depending on a receiving level.

2. The diversity apparatus according to claim 1, wherein the phase shifter switches a phase by 90°.

3. The diversity apparatus according to claim 2, wherein the phase shifter includes:

a first transmission line;

a second transmission line having a line length different from that of the first transmission line; and a switch which switches a transmission line through which the carrier wave transmitted from the transceiver is output to the first transmission line or the second transmission line.

4. The diversity apparatus according to claim 3, wherein the first transmission line and the second transmission line each includes circuits obtained by combining a plurality of series resistors R and a plurality of parallel capacitors C.

5. The diversity apparatus according to claim 2, wherein the power divider includes a hybrid coupler which distributes an input power in half.

6. The diversity apparatus according to claim 1, wherein the phase shifter includes:

a first transmission line;

a second transmission line having a line length different from that of the first transmission line; and a switch which switches a transmission line through which the carrier wave transmitted from the transceiver is output to the first transmission line or the second transmission line.

7. The diversity apparatus according to claim 6, wherein the first transmission line and the second transmission line each includes circuits obtained by combining a plurality of series resistors R and a plurality of parallel capacitors C.

8. The diversity apparatus according to claim 1, wherein the power divider includes a hybrid coupler which distributes an input power in half.

* * * * *